US00RE34547E

United States Patent [19]

Weldy

[11] E Patent Number: Re. 34,547

[45] Reissued Date of Patent: Feb. 15, 1994

[54] WALL BOARD JOINT REINFORCING SYSTEM

[75] Inventor: Derrell J. Weldy, 1316 Dewey Pl., Campo, Calif. 92006

[73] Assignees: Lewis Hein; Derrell J. Weldy; Michael D. Weldy, Santee, Calif.

[21] Appl. No.: 978,737

[22] Filed: Nov. 19, 1992

Related U.S. Patent Documents

Reissue of:

[64] Patent No.: 5,086,598
Issued: Feb. 11, 1992
Appl. No.: 438,942
Filed: Nov. 17, 1989

U.S. Applications:

[63] Continuation of Ser. No. 328,759, Mar. 23, 1989, abandoned, which is a continuation of Ser. No. 205,424, Jun. 10, 1988, abandoned, which is a continuation of Ser. No. 7,570, Jan. 28, 1987, abandoned.

[51] Int. Cl.[5] ..... E04F 19/04; E04F 13/06; E04B 1/38

[52] U.S. Cl. ..... 52/288.1; 52/257; 52/276; 52/241; 52/716.1

[58] Field of Search ..... 52/254–257, 52/287, 288, 287 R, 288, 288 MF, 276, 716.1, 241

[56] References Cited

U.S. PATENT DOCUMENTS

| | | | |
|---|---|---|---|
| 1,250,594 | 12/1917 | Knapp | 52/288 MF |
| 2,090,588 | 8/1937 | Witsell | 52/254 |
| 2,114,044 | 4/1938 | Bonnell | 52/288 |
| 2,593,859 | 4/1952 | Dunlap | 52/276 |
| 2,821,754 | 2/1958 | Hillson | 52/716 |
| 2,904,992 | 9/1959 | Cruser | 52/256 |
| 2,921,352 | 1/1960 | Pfeifle | 52/287 R |
| 3,008,273 | 11/1961 | Widin . | |
| 3,201,908 | 8/1965 | Arnold . | |
| 3,203,517 | 8/1965 | Stein | 52/288 |
| 3,255,561 | 6/1966 | Cable . | |
| 3,559,356 | 2/1971 | Koral | 52/288 |
| 3,712,003 | 1/1973 | Hallock et al. | 52/288 |
| 3,989,397 | 11/1976 | Baker | 52/288 |
| 4,012,878 | 3/1977 | Ellingson | 52/288 |
| 4,150,517 | 4/1979 | Warner, Sr. | 52/288 |
| 4,198,455 | 4/1980 | Spiro et al. | 52/288 |
| 4,288,016 | 9/1981 | Failla et al. | 52/254 |
| 4,313,991 | 2/1982 | Lamb | 52/255 |
| 4,315,390 | 2/1982 | Schaafsma . | |
| 4,430,833 | 2/1984 | Balzer et al. | 52/288 |
| 4,569,171 | 2/1986 | Kuhr et al. | 52/288 X |
| 4,722,153 | 2/1988 | Hardy | 52/254 |
| 4,863,774 | 9/1989 | Tucker . | |
| 4,876,837 | 10/1989 | Kelly et al. | 52/287 |
| 4,912,899 | 4/1990 | Plasker et al. | 52/241 |

FOREIGN PATENT DOCUMENTS

| | | | |
|---|---|---|---|
| 245619 | 6/1963 | Australia | 52/288 |
| 598431 | 5/1960 | Canada | 52/288 |
| 633108 | 12/1961 | Canada | 52/288 |
| 858168 | 12/1970 | Canada | 52/288 |
| 844055 | 7/1952 | Fed. Rep. of Germany | 52/727 |
| 3238312 | 3/1984 | Fed. Rep. of Germany | 52/288 |
| 392025 | 9/1965 | Switzerland . | |
| 2056523 | 3/1981 | United Kingdom . | |
| 2166771 | 5/1986 | United Kingdom | 52/288 |
| 2173529 | 10/1986 | United Kingdom | 52/288 |

*Primary Examiner*—Carl D. Friedman
*Assistant Examiner*—Robert J. Canfield
*Attorney, Agent, or Firm*—Brown, Martin, Haller & McClain

[57] ABSTRACT

A wall edging system for strengthening the wall intersections of buildings replaces the conventional metal corner bead used on drywall joints. The principal element of the system is an extruded plastic strip having a thickened, arcuate central area and two outwardly extending flanges which are othogonally oriented to one another, so that the thickened central portion runs along the seam between the orthogonally intersecting walls, and the flanges extend outwardly along the thickened central portion to be nailed into the drywall to secure the strip to the edge. Means is provided for providing a purchase for the mud that is applied over the flanges, and in addition to the strip there are other pieces defining two-leg and three-leg inside and outside corners, these pieces having tongues extending from each of the legs which slip beneath the central, thickened portions of the adjacent linear strips to provide a secure meeting at the corner.

19 Claims, 1 Drawing Sheet

WALL BOARD JOINT REINFORCING SYSTEM

Matter enclosed in heavy brackets [ ] appears in the original patent but forms no part of this reissue specification; matter printed in italics indicates the additions made by reissue.

This is a *Reissue of application Ser. No.* 07/438,942 *filed Nov.* 17, 1989 *now U.S. Pat. No.* 5,086,598, *which is a* continuation of application Ser. No. 07/328,759 filed Mar. 23, 1989 now abandoned which is a continuation of 07/205,424 filed Jun. 10, 1988 now abandoned; which is a continuation of 07/007,570 field Jan. 28, 1987 now abandoned.

BACKGROUND OF THE INVENTION

The invention is in the field of finishing interior walls, and specifically relates to finishing the edges at intersections where two or three walls meet, either as an inside corner or as an outside corner.

Currently, any intersection between two drywall planes, which is an obtuse or "outside" intersection, is covered with a metallic strip which defines a corner bead and has orthogonally oriented flanges which are nailed to the adjacent drywall, with the central bead falling over the intersection itself. These strips have been used for many years and are in widespread current use. Because of their construction however, they have certain inherent defects. One of the major defects is the fact that even though they are galvanized or otherwise coated with a non-corrosive coating, the strips will sometimes corrode or rust anyway, and bleed through the overlying plaster or mud, creating an unsightly appearance.

Another drawback of the metallic strips is inherent in the fact that the malleable metal from which they are made has a very poor memory, and is subject to being dented or wrinkled, after which it is difficult to straighten to produce a smooth finish. Because of the rough handling to which most of the material at a work site is subjected, it is not uncommon for the strips to be wrinkled, dented and perhaps twisted, thus rendering them either unuseable, or useable only to produce a slightly inferior end result.

Additionally, the metal strips are used in large quantities in construction, and can up to a considerable cost. A means of reducing this cost would find a warm reception in the buidling industry because although the cost savings on one strip may be not be significant, the enormous numbers of the strips that are used would provide a substantial savings to builders of even a single dwelling, not to mention a whole tract or large office building.

Attempts have been made to create other types of strips which are made of plastic rather than metal to resolve some of the above-stated problems. Among these are those described in U.S. Pat. No. 2,114,044 issued to W. L . Bonnell; U.S. Pat. No. 3,712,003, issued to Edward C. Hallock et al., and U.S. Pat. No. 4,315,390 to Michael Schafsma. These attempts toward resolving the problem have produced edge beads which by and large lie underneath the drywall at the intersection between two drywall panels. This approach does not conform to present techniques, whereupon the bead is put on after the drywall has already been put in place, and this requires the re-education of construction workers, who tend to be set in their ways.

Another approach is taken in U.S. Pat. No. 4,012,878 issued to Robert T. Ellingston. This strip can be put in place after the drywall is in place. It is characterized by having an air pocket and a double layer for providing resilience to impact, so that the underlying wall corner or edge is not damaged from impact. However, not only does the double-walled construction not lending itself to ease in manufacture by extrusion, but it could also somewhat problematic in that the paint and plaster or mud which is applied over the trim would be cracked and would tend to flake because of the deformation of the underlying strip when it is impacted.

There is a need, therefore for a simple, plastic strip which is designed to be easily extruded, and which is provided with accompanying corner pieces to accomodate the most commonly encountered intersections of edges into corners, which includes both inside outside corners, and corners with two or three lines defined by intersecting wall planes.

SUMMARY OF THE INVENTION

The instant invention fulfills the above-stated need and provides as its central element an elongated strip having an arcuate central portion which ordinarily would arc in cross section on the order of 90 degrees, but as a smooth curve rather than a sharp angle. Extending outwardly from the edges of the arc are a pair of flanges which define a 90 degree angle relative to one another. The flanges are either striated externally to help the mud adhere thereto, or provided with punched-out holes periodically along the flanges, or both. In addition, the central area and perhaps the flanges as well, are preferably factory-coated with a primer. This will adapt the surface of the strip, which is petrochemical in nature by virtue of the strip being plastic, to an overlying water-based coating of paint. This primer will also help the adhesion of the plaster or mud, which of course is also water-based.

In addition to the central strip, and of substantially the same construction in its straight lengths, there are as many as four molded corner pieces to create a complete set. These corner pieces each have extending legs which terminate in a short flange which will engage beneath the adjacent straight strip. Because of the construction of orthogonal rooms and dwellings, there are intersections of outside two-planed edges which come in the form of two-edge intersections, and three-edge intersections, both inside and outside. There are thus four corner pieces which, together with the strips, would define a substantially complete system for an entire dwelling. The legs extend from the corner pieces about three inches, and the straight strips are butted into end along any particular edge, and can be easily ut to length to fit between two adjacent strips, an adjacent strip and an adjacent corner piece, or two corner pieces.

DETAILED DESCRIPTION OF THE PREFERRED EMBODIMENT

Figure 1:
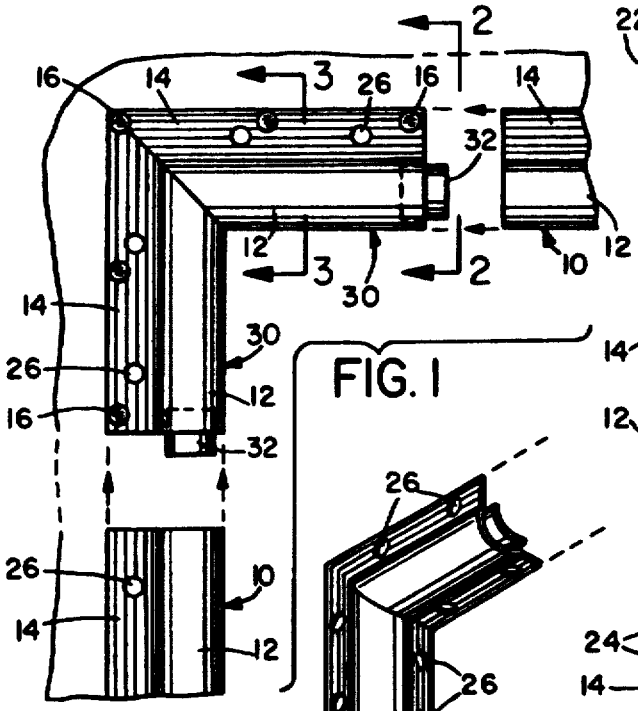
FIG. 1. is an elevation illustrating a corner piece exploded from adjoining straight strips.
Figure 2:
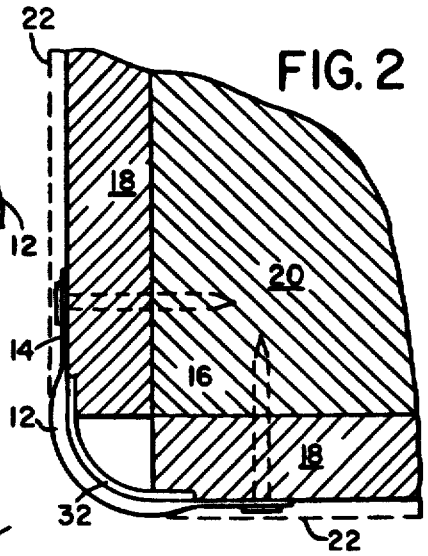
FIG. 2. is a section taken through a typical wall construction outside corner illustrating the corner strip in place after it has been nailed and butted into position.
Figure 4:
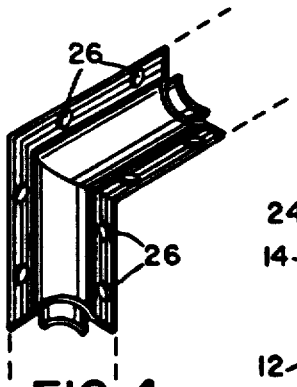
FIG. 4 illustrated a two-leg inside corner.
Figure 3:
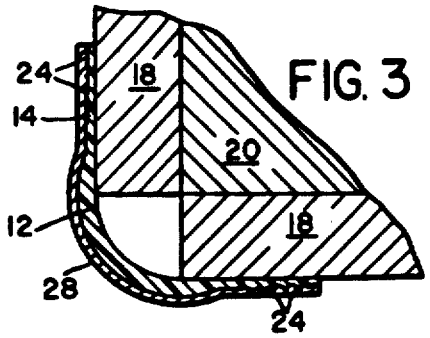
FIG. 3. is a section similar to FIG. 2 illustrating the striations on the strip flanges and the primer coating on the outside of the strips.
Figure 5:
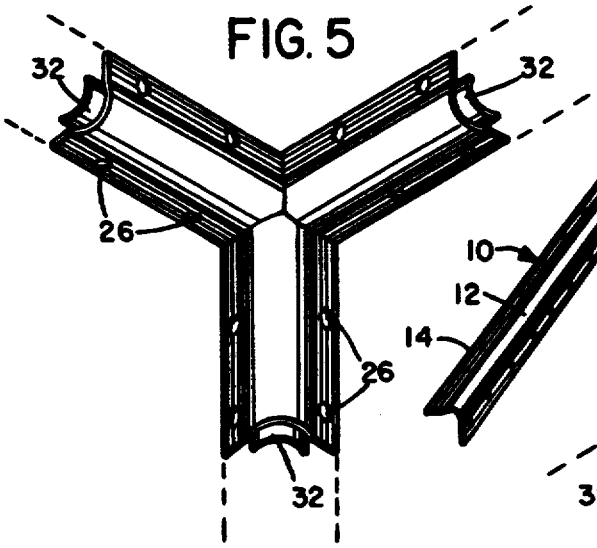
FIG. 5 illustrates a three-leg outside corner.
Figure 7:
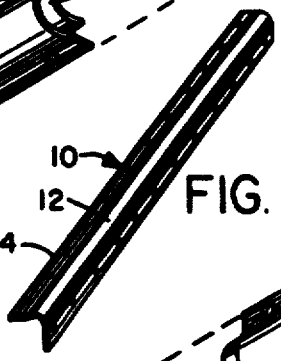
FIG. 7 illustrates a typical strip.
Figure 6:
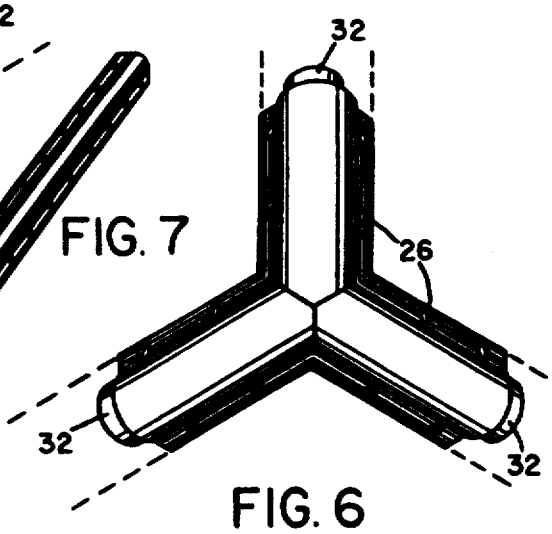
FIG. 6 illustrates a three-leg inside corner.

A strip 10 is shown overall in FIG. 7, and is seen in detail in FIGS. 1 through 3. As shown in FIG. 2 and 3, the strip has a thickened, arcuate central portion 12 and a pair of orthogonally related extend flanges 14 which fit on a two-plane edge as shown in FIG. 2. As illustrated in the drawings, the central arcuate portion is wider than the side flanges, and has a chord length or width between two opposing points on its opposite side edges which is greater than the width of a side flange (see FIG. 6). The central arcuate portion 12 is recessed or indented at its outer side edges, as can be seen in FIGS. 2 and 3, to form a stepped or tapering transition or junction between the central portion 12 and the side flanges 14. The strip is a length or extruded plastic, and the plastic is generally rigid, but is adequately soft and resilient to permit nails to be hammered through the flanges with a normal hammering effort. As shown in FIG. 2 nails 16 are hammered directly through the flanges 14 and through the drywall 18 into the wooden stud 20, all of which is typical, standard corner construction in residential and low-rise office construction.

Once the strip has been secured in place with nails as shown in FIG. 2, the drywall mud 22 is applied over the nail heads and over the joint between the strip and the adjoining drywall. It can be seen from an examination of FIG. 2 that a finished surface is provided, and when painted, a smooth, finished surface is provided.

In order to assist the mud in adhering to the strip, several things can be done. First, the flanges can be striated as shown at 24 on their surface which will face outwardly when secured over an inner or outer wall intersection, as illustrated in the drawings. These striations, much like record grooves, will engage and hold the mud. The may be spaced from the thickened portion 12 of the strip by space of about 0.006 inches, or six thousandth of an inch. This space provides a transition zone between the drywall and the strip itself to ensure the striations do not show through the paint. The striations extend out to the outermost side edge of each side flange, as can be seen in FIG. 3, to provide a purchase for mud or plaster applied over the side flanges as in FIG. 3 and to reduce the risk of the plaster separating from the strip.

There may also be provided holes 26 which permit the mud to ooze through the strip and bond directly to the drywall. These holes are not needed for nail holes and are not used as such, as the nails are pounded directly through the flanges as shown in FIG. 1, without the necessity of holes being provided. The holes are strictly to provide a "keying" or purchase for the mud.

Additionally, at least the central portion, and possibly the entire unit is ideally covered with a primer 28 to help both the paint and the mud bond to the strip. A strip with the striations, the punched holes, and the primer will have no trouble in holding both the drywall and water-based paint to its surface.

The strip itself can be provided in any desired length, inasmuch as it is extruded, although 8 feet being an industry standard. It can be very easily cut to any desirable length. In addition to the strips, there are corner pieces, which, as indicated above, may have either two or three legs and be either inside corners or outside corners.

FIG. 1 illustrates a two-leg, inside corner. Each of the legs 30 extends outwardly from the central portion of the corner and terminates, and at the termination defines a tongue 32. The tongue extends beneath the adjacent strip as shown in FIG. 1, for a secure, flush surface. This is also a very strong surface. It can be understood that by using the molded corners so that there are not two mitered pieces butting into one another at the corner, and the tongues which engage under the adjacent straight strips, the corners are a very strong part of the construction when this system is used, and do not suffer from the weakness sometimes inherent in the use of traditional corner bead construction.

The other corner pieces that are shown in the drawings are similar in construction both to the straight strips and to the two-leg inside corner of FIG. 1 there being modifications of geometric configuration necessary to accomodate three legs instead of two, and outside corners instead of inside corners. However, the punched hole construction and the end tongues are present on all the corners, inside or out, whether two leg or three. The entire system will accomodate any generally orthogonally oriented system of rooms or spaces. Clearly, the cross-section of the strip and the corner pieces could be modified to accomodate other than 90 degree walls, and the radius of curvature of the central portion can be expanded or contracted for a smaller or larger curvature, or even a substantially angular corner. However, one of the main benefits of the system is the fact that it can easily make rounded corners, which are increasing in popularity.

I claim:

1. A wall edging system for reinforcing building wall intersections, comprising;

an elongate, resilient strip formed from a single piece of plastic;

the strip comprising a central arcuate portion extending along the length of the strip and a planar side flange projecting outwardly from each side edge of the arcuate portion;

each flange having a plurality of linear striations on a face comprising evenly spaced, straight grooves and ridges, the striations extending along the length of the strip 3 the striations terminate short of the junction between the flange and adjacent edge of the arcuate portion on one side and extending up to the outer peripheral edge of the respective flange.

2. The system as claimed in claim 1, wherein each flange has a series of holes punched there through for providing additional purchase for plaster compound applied to the flanges.

3. The system as claimed in claim 1, wherein the central arcuate portion has a thickness greater than that of the side flanges.

4. The system as claimed in claim 1, wherein said striations are of sawtooth shape in cross-section.

5. The system as claimed in claim 1, wherein said arcuate portion extends around an angle of the order of 90 degrees.

6. The system as claimed in claim 1, wherein a surface coating of primer material covers said one face of said flange.

7. The system as claimed in claim 1, wherein the central arcuate portion has a chord length measured between opposing points on the opposite side edges of the arcuate portion which is no less than the width of the side flanges.

8. A wall edging device for reinforcing building wall intersections, comprising:

an elongate, resilient strip formed from a single piece of plastic;

the strip having a central arcuate portion extending along the length of the strip and a planar side flange projecting outwardly from each side edge of the arcuate portion, the outer, convex face of the arcuate portion being indented at each of the opposite side edges of the arcuate portion to form a stepped junction between the arcuate central portion and adjacent side edge, and the arcuate portion having a chord length measured between opposing points on the opposite side edges of said arcuate portions which is greater than the width of a side flange;

each side flange having keying means on a face for providing a purchase for plaster compound applied to the flanges, said keying means extending along the length of the strip and outwardly to the outermost side edge of the flange said keying means being linear striations comprising evenly spaced straight grooves and ridges.

9. A three way corner device for strengthening building wall intersections at corners, comprising:

a corner member formed form a single piece of plastic and comprising three perpendicular legs joined together in a central, corner region;

each leg comprising a central, arcuate region extending along the length of the leg and a planar side flange projecting outwardly from each side edge of the arcuate portion, the arcuate region being of width at least equal to that of a side flange; and, the side flanges having keying means for providing a purchase for plaster compound applied to the flanges, the keying means extending up to the outermost side edge of each side flange said keying means being linear striations comprising evenly spaced straight grooves and ridges.

10. The device as claimed in claim 9, wherein each leg has an arcuate tongue of reduced thickness projecting from the outermost end of the central arcuate portion only of said leg.

11. A wall edging system for strengthening building wall intersections, comprising:

a first edging strip comprising a linear, resilient strip formed from a single piece of plastic and comprising a central arcuate portion extending along the length of the strip and a planar side flange projecting outwardly from each side edge of the arcuate portion;

a second edging strip comprising a two-way corner having a pair of legs joined in the middle of the strip and extending at right angles to one another, each leg of the two way corner having a central arcuate portion extending along the length of the leg and a substantially planar side flange projecting outwardly from each side edge of the arcuate portion; and a third edging strip comprising a three-way corner having three legs joined together in a central, corner region of the strip and extending at right angles to one another from said corner region, each leg having a central arcuate portion extending along the length of the leg and a substantially planar side flange projecting outwardly from each side edge of the arcuate portion; and each leg of each of said [first and] second *and third* strips having an arcuate tongue of reduced thickness extending axially from the outermost free end of the central arcuate portion of the respective leg for engagement beneath the central arcuate portion of an abutting linear strip wherein the side flanges of each of said strips have keying means for providing a purchase for plaster compound applied to the flanges, the keying means extending along the length of one face of each of the side flanges, the keying means extending outwardly to the outermost side edge of each of the side flanges; said keying means being linear striations comprising evenly spaced straight grooves and ridges.

12. The system as claimed in claim 11, including two types of said second edging strip comprising a two way inside corner and a two way outside corner, and two types of said third edging strip comprising a three way inside corner and a three way outside corner, the outside corners having said keying means on the faces of said side flanges adjacent the convex side of said arcuate central portion and the inside corners having said keying means on the faces of said side flanges adjacent the concave side of said arcuate central portions.

*13. A wall edging system for strengthening building wall intersections, comprising:*

*a first edging strip comprising a linear, resilient strip formed from a single piece of plastic and comprising a central arcuate portion extending along the length of the strip and a planar side flange projecting outwardly from each side edge of the arcuate portion;*

*a second edging strip comprising a two-way corner having a pair of legs joined in the middle of the strip and extending at right angles to one another, each leg of the two-way corner having a central arcuate portion extending along the length of the leg and a substantially planar side flange projecting outwardly from each side edge of the arcuate portion;*

*a third edging strip comprising a three-way corner having three legs joined together in a central, corner region of the strip and extending at right angles to one another from said corner region, each leg having a central arcuate portion extending along the length of the leg and a substantially planar side flange projecting outwardly from each isde edge of the arcuate portion;* each leg of each of said second and third strips having an arcuate tongue of reduced thickness extending axially from the outermost free end o the central arcuate portion of the respective leg for engagement beneath the central arcuate portion of an abutting linear strip; and

*the arcuate portions of each of said strips having a width at least equal to that of a side flange.*

*14. A three-way corner device for strengthening building wall intersections at corners, comprising:*

*a corner member formed from a single piece of plastic and comprising three perpendicular legs joined together in a central, corner region;*

*each leg comprising a central, arcuate region extending along the length of the leg and a planar side flange projecting outwardly from each side edge of the arcuate portion, the arcuate region having a chord length between opposing points on the opposite side edges of the arcuate portion which is no less than the width of a side flange, the arcuate portion extending around an angle of the order of 90°; and*

*each leg having an arcuate tongue of reduced thickness projecting from the outermost end of the central arcuate portion only of said leg.*

*15. The device as claimed in claim 14, including two types of said corner member comprising a three-way inside corner for fitting over an interior corner of a building said a three-way outside corner for fitting over an outside corner of a building, the arcuate central portion of each leg having a convex face and concave face, and each side flange having a first face on the same side as said convex face and a second, opposite face on the same side as said concave face, each side flange of each leg of said inside corner having keying means on said second face for providing a purchase for plaster compound applied to the flanges, and each side flange of each leg of said outside corner having keying means on said first face for providing a purchase for plaster compound applied to the flanges.*

*16. A wall edging system for strengthening building wall intersections, comprising:*

*a first edging strip comprising a linear, resilient strip formed from a single piece of plastic and comprising a central arcuate portion extending along the length of the strip and a planar side flange projecting outwardly from each side edge of the arcuate portion;*

*a second edging strip comprising a two-way corner having a pair of legs joined in the middle of the strip and extending at right angles to one another, each leg of the two-way corner having a central arcuate portion extending along the length of the leg and a substantially planar side flange projecting outwardly from each side edge of the arcuate portion;*

*a third edging strip comprising a three-way corner having three legs joined together in a central, corner region of the strip and extending at right angles to one another from said corner region, each leg having a central arcuate portion extending along the length of the leg and a substantially planar side flange projecting outwardly from each side edge of the arcuate portion; and*

*each leg of each of said second and third strips including a tongue portion of reduced thickness extending up to the outermost free end of the respective leg for engagement beneath an abutting linear strip, and the side flanges of said first strip having keying means for providing a purchase for plaster compound applied to the length of one face of each of the side flanges, the keying means extending outwardly to the outermost side edge of each of the side flanges, said keying means being linear striations comprising evenly-spaced straight grooves and ridges.*

*17. A wall edging system for strengthening building intersections, comprising:*

*a first edging strip comprising a linear, resilient strip formed from a single piece of plastic and comprising a central arcuate portion extending along the length of the strip and a planar side flange projecting outwardly from each side edge of the arcuate portion;*

*at least one additional edging strip comprising a three-way corner having three legs joined together in a central, corner region of the strip and extending at right angles to one another from said corner region, each leg having a central arcuate portion extending along the length of the leg and a substantially planar side flange projecting outwardly from each side edge of the arcuate portion; and*

*each leg of said three-way corner including a tongue of reduced thickness extending up to the outermost free end of the respective leg for engagement beneath an abutting linear strip.*

*18. The system as claimed in claim 1, including a corner member formed from a single piece of material, the corner member comprising a two-way corner having a pair of legs joined in the middle of the strip and extending at right angles to one another, each leg having a central arcuate portion extending along the length of the leg and a planar side flange projecting outwardly from each side edge of the arcuate portion.*

*19. The system as claimed in claim 1, including a corner member formed from a single piece of material, the corner member comprising three perpendicular legs joined together in a central, corner region, each leg comprising a central arcuate portion extending along the length of the leg and a planar side flange projecting outwardly from each side edge of the arcuate portion.*

* * * * *

UNITED STATES PATENT AND TRADEMARK OFFICE

CERTIFICATE OF CORRECTION

PATENT NO. : RE. 34,547

DATED : 02/15/94

INVENTOR(S) : WELDY, DERRELL J.

It is certified that error appears in the above-indentified patent and that said Letters Patent is hereby corrected as shown below:

Column 6, line 43, delete "isde" and insert -- side --;

Column 6, lines 45 through 50, the entire paragraph should be printed in italics; and Column 7, line 3, delete "said" and insert -- and --.

Signed and Sealed this

Thirtieth Day of August, 1994

*Attest:*

*Attesting Officer*

BRUCE LEHMAN

*Commissioner of Patents and Trademarks*